Aug. 29, 1961  W. R. DUCHENE ET AL  2,998,512
RECESSED LIGHTING FIXTURE

Filed March 13, 1959  3 Sheets-Sheet 1

INVENTORS
WILLIAM R. DUCHENE
KENDALL ARLEDGE
JOHN JACOMINO

BY Fisher, Christen & Goodson,
ATTORNEYS

Aug. 29, 1961 W. R. DUCHENE ET AL 2,998,512
RECESSED LIGHTING FIXTURE
Filed March 13, 1959 3 Sheets-Sheet 2

INVENTORS
WILLIAM R. DUCHENE
KENDALL ARLEDGE
JOHN JACOMINO
BY Fisher, Christen & Godson
ATTORNEYS Aug. 29, 1961 W. R. DUCHENE ET AL 2,998,512
RECESSED LIGHTING FIXTURE
Filed March 13, 1959 3 Sheets-Sheet 3

INVENTORS
*WILLIAM R. DUCHENE
KENDALL ARLEDGE
JOHN JACOMINO*

BY *Fisher, Christen & Goodson,*
ATTORNEYS

United States Patent Office 2,998,512
Patented Aug. 29, 1961

2,998,512
RECESSED LIGHTING FIXTURE
William R. Duchene, Hixson, and Kendall Arledge and John Jacomino, Chattanooga, Tenn., assignors to Special Products Company of Tennessee, Inc., a corporation of Tennessee
Filed Mar. 13, 1959, Ser. No. 799,246
9 Claims. (Cl. 240—78)

This invention is an improvement in that type of lighting fixture that is mounted in a ceiling or wall recess.

Fixtures of this type comprise a box-like casing having a back and usually four side walls, the bottom of the casing having detachably secured thereto a translucent bottom, through which the light from a light source in the casing is directed downwardly, when the fixture is mounted in a recess in the ceiling.

The principal object of this invention is to provide an improved wiring box, mounted on the outside wall of the casing, wherein the casing and the wiring box can be vertically moved at an angle to its upmost position to clear a hole in the ceiling or wall large enough to receive the fixture box only, and returned to its normal position after installation of the casing and having an open end in registry with an opening in one wall of the casing. This wiring box cooperates with a mounting plate larger than the wall opening, such plate being provided with a socket for a light source.

The wiring box is provided with a transverse partition, dividing the wiring box into inner and outer compartments; wiring connections are in the outer compartment, while the inner compartment provides a heat-insulating air space for insulating the wiring connection from the heat of the light.

An important feature of such partition is that it is hinged along its lower edge, so that when the mounting plate is swung downwardly and outwardly as described, the partition also swings downwardly, thereby greatly facilitating the visual inspection of the wiring in the wiring box. Latching means are provided for holding the hinged partition in its normal position transverse of the wiring box.

In order to provide ready accessibility to the mounting plate carrying the light, it is detachably secured in place, so that when the bottom translucent cover is removed, such plate may be swung downwardly and inwardly of the casing. The wires from the back of the mounting plate pass first into the inner heating insulating compartment and then through one or more holes in said hinged partition into the outer compartment.

The casing is provided with a reflector, and the translucent cover is mounted on spring controlled arms, which hold the cover closed, or open, during the light replacement operation.

Other improved features will be described in connection with the accompanying drawings, wherein.

Referring now to these drawings, the fixture comprises a box-like casing having a back or top wall 2 and vertical side walls 4, 6, 8 and 10. The lower edges of the side walls terminate in out-turned flanges 12 and the back wall carries a reflector 14.

Figure 4:
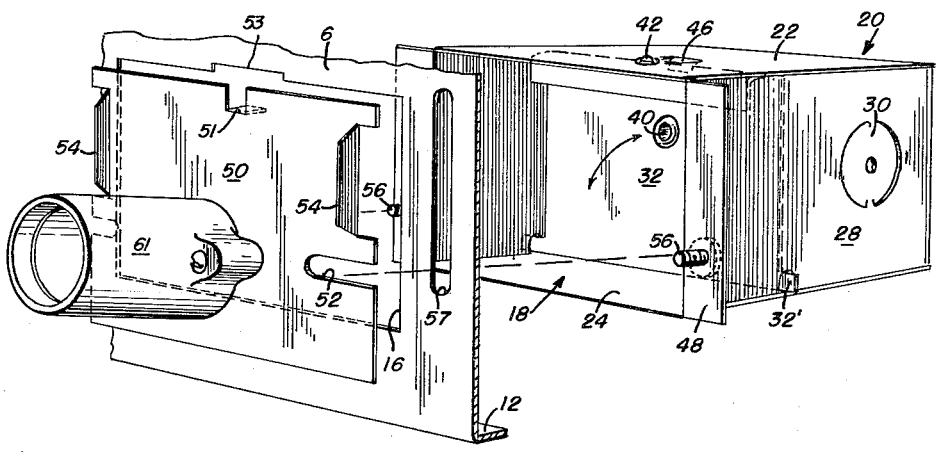
FIG. 4 is an exploded perspective view of the mounting plate and wiring box.
Figure 5:
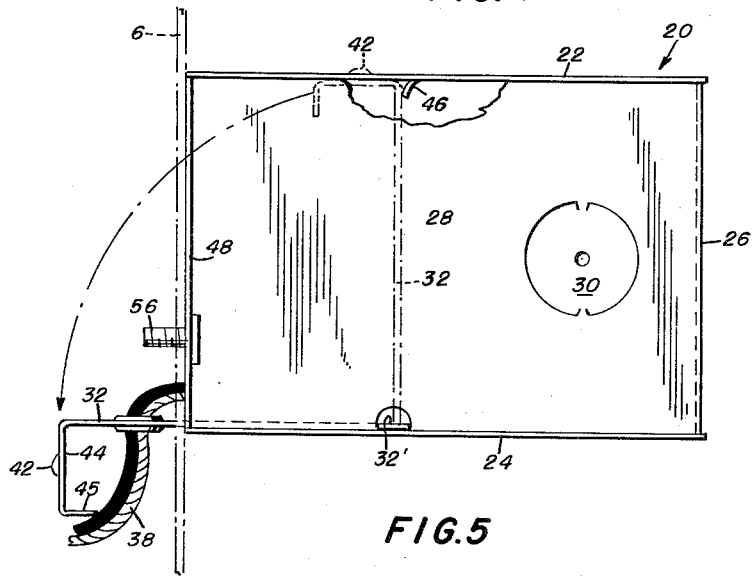
FIG. 5 is an enlarged vertical section through the wiring box.

One wall, such as 6, is provided with an opening 16 (FIG. 4) of substantial size, which co-operates with the open end 18 of the wiring box indicated generally at 20. The wiring box 20 comprises a top 22, bottom 24, back wall 26 and side walls 28 and the usual knock-out disks 30 in its various walls.

Figure 2:
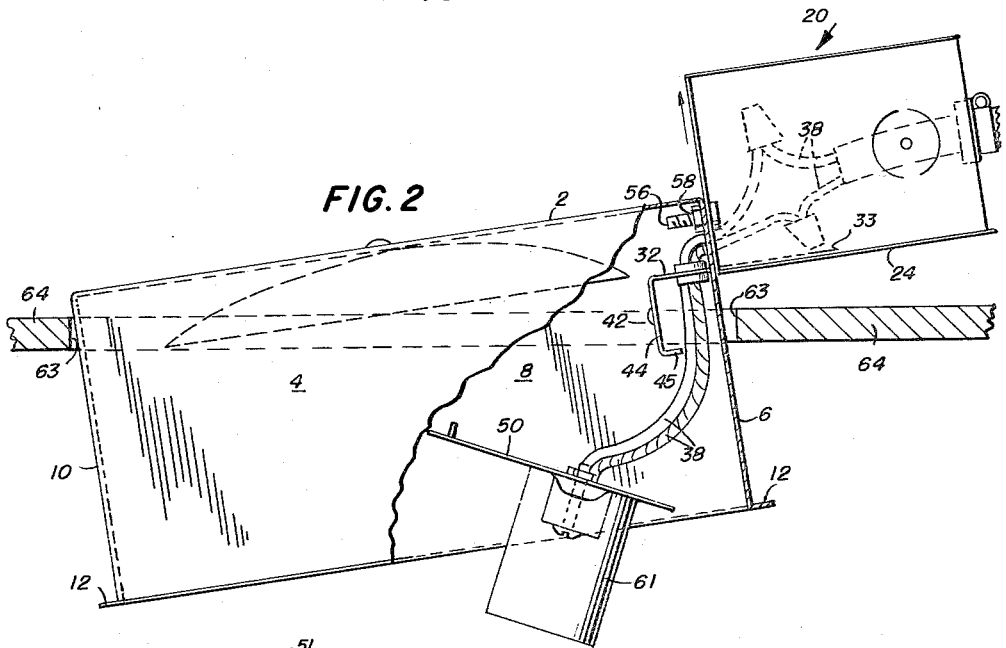
FIG. 2 is a similar view, showing the fixture being removed or replaced in a ceiling recess.
Figure 3:
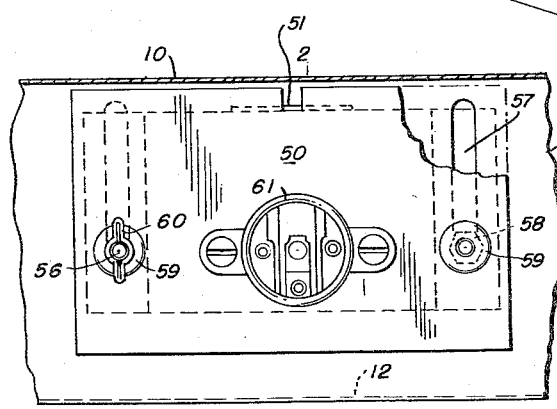
FIG. 3 is a front view of the plate for the lamp socket.

An important feature of the wiring box is a normally vertical transverse partition 32, hinged at its lower edge 33 to bottom wall 24, so that it can swing 90° to the position of FIG. 2. Partition 32 divides the box 20 into an outer compartment 35 and an inner compartment 36. Compartment 35 provides for connecting wires 38, which are passed loosely through a hole 40 in the partition and provides a space for accommodating connections between these wires 38 and the usual line wires.

Compartment 36 defined by partition 32, provides an air space for insulating outer compartment 35 and the wires therein, from heat from the light.

Partition 32 is latched in vertical position by an outstruck spring latch 42 on a resilient flange 44 integral with the partition, and is provided with a finger piece 45, such latch being adapted to snap in and out of a hole in top 22. A downstruck lip 46 provides a stop for the partition 32.

The open end 18 of wiring box 20 is bordered by vertical out-turned flanges 48 integral with the side walls 28.

A mounting plate 50 for the light is adapted to extend oven opening 16 in wall 6 of the housing. This plate may be provided with holes or slots 52 in opposite edges and is provided with inturned positioning flanges 54; plate 50 covers opening 16. A lug 51 on plate 50 fits into recess 53 on wall 6, to insure assembly right side up.

Where openings 53 are in the form of holes rather than slots, wing nuts 60 are removed to remove mounting plate 50.

Figure 1:
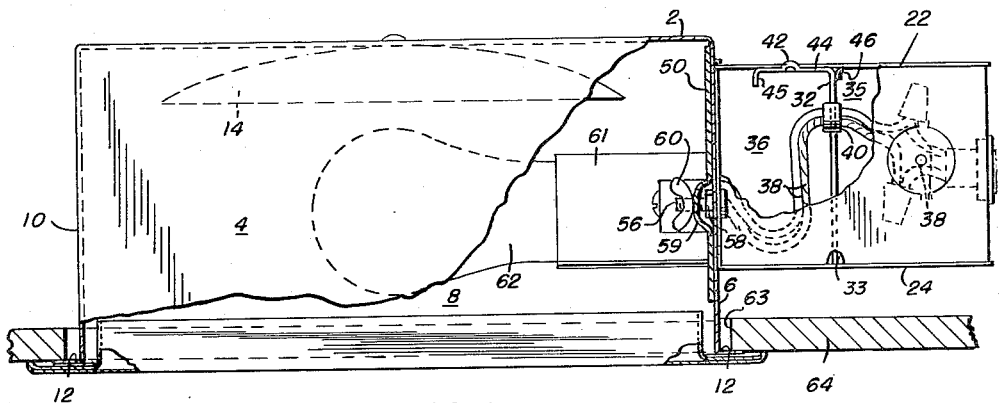
FIG. 1 is a side view partly in vertical section, of the improved lighting fixture.

In order to secure the wiring box 20 and mounting plate 50 in place, threaded studs 56 carried by flanges 48 on the wiring box pass through vertical slots 57 in housing wall 6; lock nuts 58 are threaded onto studs 56 so that the studs can slide up and down in slots 57; the studs 56 extend through registering holes in plate 50, each such hole being bordered by an outwardly convex, circular ridge or bulge 59, FIG. 1; studs 56 extend out through 59, wing nuts 60 serving to secure studs 56 and the wiring box in normal position. When the wing nuts are tightened, against convex ridges 59, there is provided a resilient locking effect.

The studs 57 in wall 6 are important, in that they provide a type of mounting for the wiring box 20 permitting the installation or removal of the entire fixture in a normal size wall opening, as defined by the edges 63 of the recess in the ceiling or wall 64 and without the necessity of cutting away the ceiling opening to accommodate the box 20. For such installation, the wing nuts 60 are loosened or removed, plate 50 and the wiring box 20 are moved to their uppermost position, as in FIG. 2, as permitted by vertical slots 57, and the fixture inserted by first inserting box 20 thru opening 63, at an angle as in FIG. 2, then turning the fixture clockwise until the flanges 12 are flush with ceiling 63. Reversal of these movements permits the removal of the entire fixture thru the opening 63.

After removal of the fixture, latch 42 is pressed to release partition 32 and plate 50 is manually pulled downwardly and inwardly to the position of FIG. 2 and inspection and repair of the wiring box can be made as desired. When this is done, partition 32 swings about its lower edge, aided by finger piece 45, to the position of FIG. 2, a minimum pull being exerted on wires 38, which slide loosely through hole 40 and so the connections to the line wires in outer compartment 35 are not disturbed.

After the desired inspection or repair is made of the wiring box, the operation is reversed, partition 32 being returned manually to its vertical position and latched there by latch 42, and the wing nuts 60 tightened up.

The mounting plate carries a light socket 61 for a light 62, which is connected to wires 38.

Figure 6:
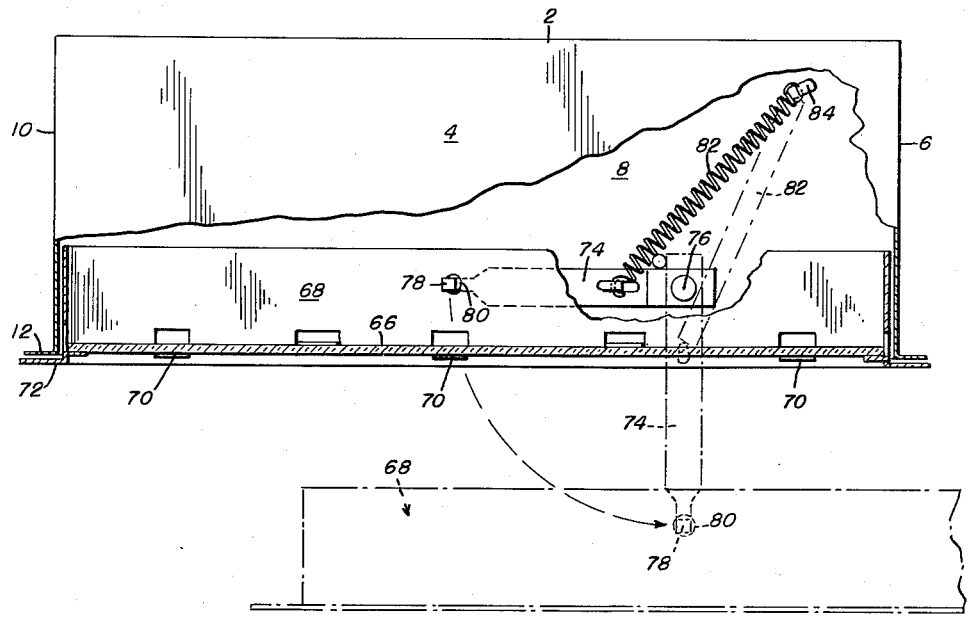
FIG. 6 is a vertical section of the cover plate mounting.
Figure 7:
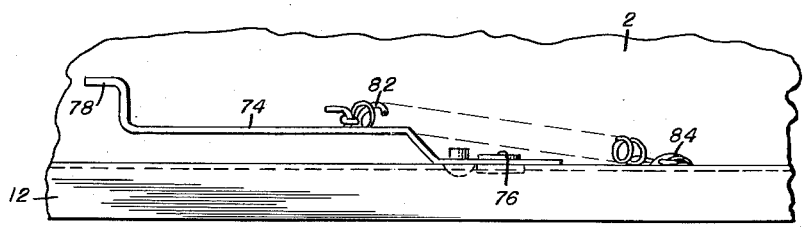
FIG. 7 is a plan view of a portion of FIG. 6.

FIGS. 6 and 7 show the preferred mounting for the translucent cover. The translucent cover 66 is held in a frame 68 by inturned tongues 70, frame 68 having outwardly extending horizontal flanges 72, adapted to abut similar flanges 12, FIG. 1, carried by the walls of the casing. A pair of levers 74 are pivoted at 76 to opposite walls 4 and 8 of the casing. These levers terminating in mounting lugs 78 which pivotally engage in small openings 80 in opposite side walls of movable frame 68.

A fairly strong spring 82 is attached to each lever arm 74, the other end being secured, as at 84, to the casing wall.

In FIG. 6, the springs hold the cover closed. When access to the interior is desired, the frame 68 is pulled down manually, the lever passes dead center, and the arms 74 and springs hold the cover in open position, as in dotted lines in FIG. 6.

While the invention has been described in detail, it should be understood that the invention is not limited to the precise details illustrated, but may be carried out in other ways.

We claim as our invention:

1. A lighting fixture comprising in combination a casing having a back wall and side walls, one of said side walls being provided with an opening and with slots, a wiring box having an open end adapted to be mounted on the outside of one of the side walls of the casing, with its open end in registry with said opening in the wall of the casing, studs cooperating with the wiring box and with said side walls and slidable in said slots for providing a slidable engagement between the wiring box and said slotted side wall, an apertured partition in said wiring box dividing it into inner and outer compartments, said partition being hinged along one edge to swing toward and away from the open end of the wiring box, a mounting plate larger than said wall opening and carrying a lamp socket, the wiring from the back of said socket mounting plate being passed through the aperture in said partition, and fasteners co-operating with said mounting plate and with said wiring box for detachably mounting them in place on the co-operating wall of the casing, whereby said wiring box is slidable along that side wall provided with said opening, to and from a position where the wiring box extends beyond the back wall of said casing.

2. The combination of claim 1, further including latch means for detachable latching said partition in operative position in the wiring box.

3. The combination of claim 1, wherein said wiring box is provided with outwardly and laterally extending flanges, and detachable fastening means co-operating with said flanges and with said mounting plate, for holding said wiring box and mounting plate in operative position.

4. A lighting fixture for use in a ceiling or wall recess comprising a casing having a back wall and side walls, one of said side walls being provided with an opening, said side wall being provided with a pair of vertical slots bordering said opening, a mounting plate for a light socket, larger than said wall opening, positionable inside the casing, a wiring box having an open end adapted to register with said side wall opening, said wiring box having a pair of outwardly extending flanges substantially coextensive with said vertical slots in the side wall, and detachable fasteners carried by said flanges and passing through said vertical slots and cooperating with said side wall of the casing and with said mounting plate, for allowing relative vertical movement between said wiring box and said casing, whereby the wiring box may be moved to and from a position where the wiring box extends a substantial distance above the back wall thereof.

5. The combination of claim 4, wherein said wiring box is provided with a partition therein dividing said wiring box into two compartments for accommodating connecting wires.

6. The combination of claim 4, wherein said wiring box is provided with an apertured partition dividing said wiring box into two compartments for accommodating connecting wires, which are passed through the aperture in said partition.

7. The combination of claim 4, wherein said wiring box is provided with a partition hinged along one edge, said partition dividing the wiring box into two compartments for accommodating connecting wires.

8. The combination of claim 4, wherein said wiring box is provided with a perforated partition hinged along one edge, said partition dividing the wiring box into two compartments for accommodating connecting wires, said wires passing through the perforation in said partition.

9. The combination of claim 4, wherein said wiring box is provided with a perforated partition hinged along its lower edge, said partition dividing the wiring box into two compartments for accommodating connecting wires, which wires are passed through the perforation in the partition, and latch means for detachably holding said partition in position.

References Cited in the file of this patent

UNITED STATES PATENTS

| | | |
|---|---|---|
| 2,587,371 | Nettesheim | Feb. 26, 1952 |
| 2,728,849 | Beber et al. | Dec. 27, 1955 |
| 2,767,307 | McGinty et al. | Oct. 16, 1956 |
| 2,802,933 | Broadwin | Aug. 13, 1957 |
| 2,840,691 | Bobrick et al. | June 24, 1958 |
| 2,857,508 | Klugman | Oct. 21, 1958 |